United States Patent [19]
Iddan

[11] Patent Number: 5,561,294
[45] Date of Patent: Oct. 1, 1996

[54] HAND-HELD INFRA RED IMAGING PROBE

[75] Inventor: Gavriel J. Iddan, Haifa, Israel

[73] Assignee: State of Israel-Ministry of Defense, Armament Development Authority-Rafael, Haifa, Israel

[21] Appl. No.: 330,151

[22] Filed: Oct. 27, 1994

[30] Foreign Application Priority Data

Nov. 18, 1993 [IL] Israel ........................................ 107659

[51] Int. Cl.$^6$ ..................................................... G01J 5/02
[52] U.S. Cl. ........................ 250/330; 250/332; 250/334; 250/352; 250/341.2
[58] Field of Search .................................. 250/352, 330, 250/332, 334, 341.2, 341.8; 374/121, 124, 130, 131, 132, 209

[56] References Cited

U.S. PATENT DOCUMENTS

| | | |
|---|---|---|
| 4,378,701 | 4/1983 | Moutain et al. .................. 374/121 X |
| 4,761,556 | 8/1988 | Simpson et al. ......................... 250/352 |
| 4,773,766 | 9/1988 | Nagasaka et al. ....................... 374/124 |
| 4,987,305 | 1/1991 | Bornstein et al. ....................... 250/352 |
| 5,220,165 | 6/1993 | Holmes . | |
| 5,313,063 | 5/1994 | Netzer .................................... 250/334 |

FOREIGN PATENT DOCUMENTS

| | | | |
|---|---|---|---|
| 0518515A1 | 12/1992 | European Pat. Off. . | |
| 56-27623 | 3/1981 | Japan ..................... | 374/124 |
| 2-245620 | 10/1990 | Japan ..................... | 250/352 |
| 2-272409 | 11/1990 | Japan ..................... | 250/330 |
| WO91/12687 | 8/1991 | WIPO . | |

Primary Examiner—Carolyn E. Fields
Assistant Examiner—Edward J. Glick
Attorney, Agent, or Firm—Skjervan, Morrill, MacPherson, Franklin & Friel; Forrest E. Gunnison

[57] ABSTRACT

A hand-held probe system for imaging is described which includes a hand-held probe and a detector assembly connected by a fiber optic cable. The probe includes a hand-portable housing, a detector assembly within the housing and an IR sensor placed on the cold finger of the detector assembly. The probe can include an optical system at a known distance from the sensor and a spacing tube defining the distance between the body and the optical system. The spacing tube ensures that the body whose thermal image is being read is always at, or is very close to, the object plane of the probe. The spacing tube is typically formed of a material having minimal thermal deformation which can minimize stray IR radiation.

23 Claims, 8 Drawing Sheets

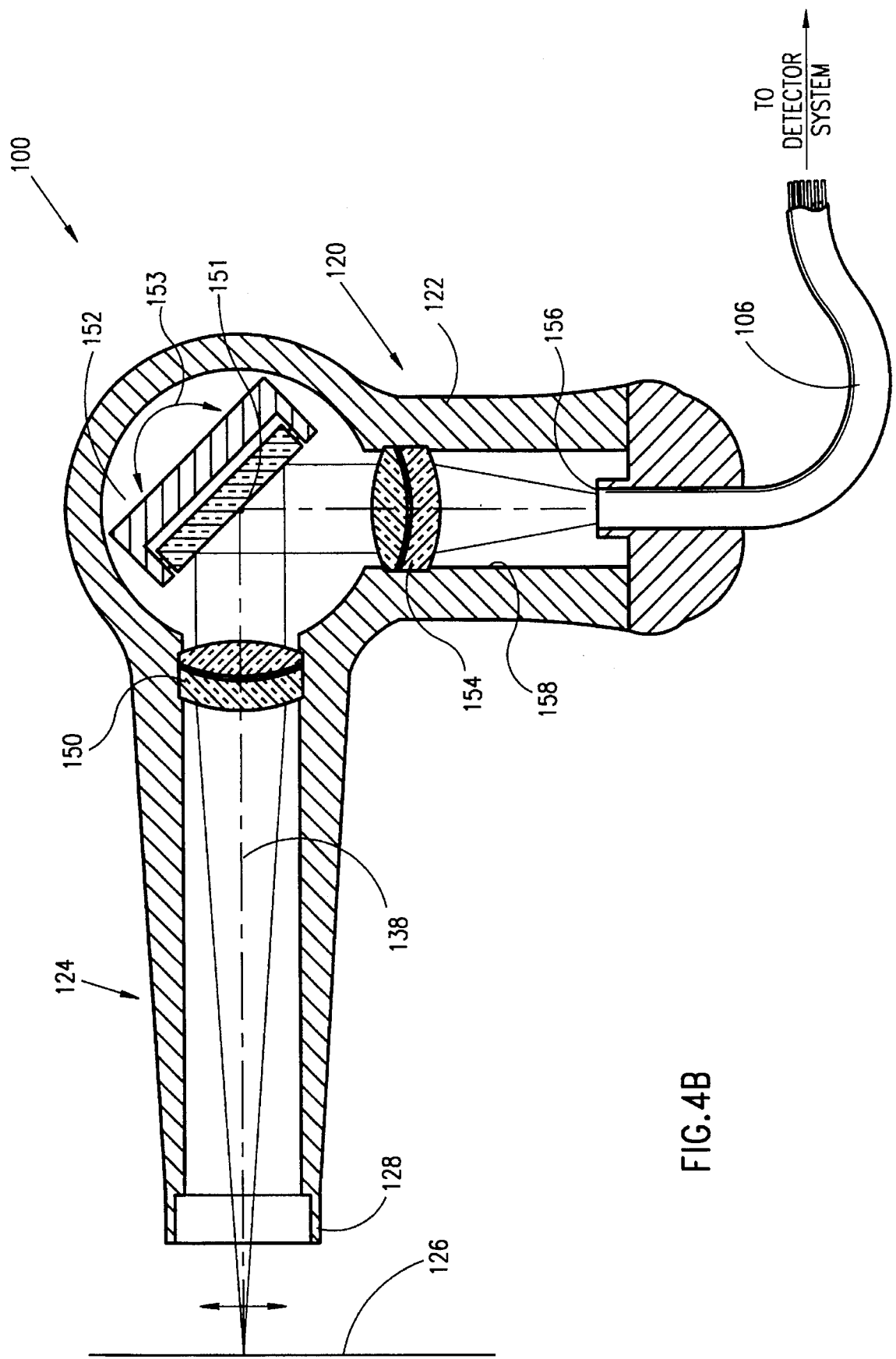

HAND-HELD INFRA RED IMAGING PROBE

FIELD OF THE INVENTION

The present invention relates to imaging infra-red sensors generally and to hand-held infra-red sensors in particular.

BACKGROUND OF THE INVENTION

Infra-red (IR) sensors are known in the art. They are utilized for thermal imaging and are often found on devices which require night vision. There are two main types of IR sensors, linear arrays which require scanning in order to produce an image, and two-dimensional arrays, often known as "staring" arrays.

IR sensors operate in extreme cold and are therefore, typically placed within a detector-dewar-cooler (DDC) assembly, formed of a dewar flask within which is a cold finger. Inside the cold linger is a cryostat which performs Joule-Thomson or other cryogenic cooling through the use of gas at a high pressure. The IR detector, or sensor, is placed at the end of the cold finger.

IR sensors and their DDC assemblies are either stationary or are placed in fixed positions on moving platforms.

SUMMARY OF THE PRESENT INVENTION

It is an object of the present invention to provide a hand-held probe for performing thermal imaging. The image can be that of a body located at a fixed distance close to the sensor or of objects at a distance from the sensor. The probe can also be part of an imaging system.

In accordance with one preferred embodiment of the present invention, the probe includes a hand-portable housing, a detector assembly within the housing and an IR sensor placed on the cold finger of the detector assembly.

In accordance with another preferred embodiment of the present invention, the probe additionally includes an optical system at a known distance from the sensor and a spacing tube defining the distance between the body and the optical system. The spacing robe ensures that the body whose thermal image is being read is always at, or is very close to, the object plane of the probe. The spacing tube is typically formed of a material having minimal thermal deformation which can minimize stray IR radiation.

In accordance with one embodiment of the present invention, the IR sensor is a two-dimensional IR sensor. Alternatively, the IR sensor is a linear array. In a further alternative embodiment, the IR sensor is a linear array and the probe includes a front-end optical system for collimating light from a field of view and a scanner for scanning the field of view across the linear array. The optical system is located between the IR sensor and the scanner.

In accordance with the present invention, the spacing tube has associated therewith detachable end attachments. One end attachment enables viewing at an angle to the axis of the tube. Another end attachment enables viewing of objects at a distance. A further end attachment enables viewing a body located parallel to an optical axis of the spacing tube. The attachment can include a detachable mirror.

In accordance with a preferred embodiment of the present invention, the detector assembly includes a cryostat having a tube through which pressurized gas flows. A high pressure supply line providing the pressurized gas to the cryostat is formed in coils thereby enabling it to be flexibly moved.

Moreover, in accordance with a preferred embodiment of the present invention, the probe includes image sharpening apparatus. The apparatus includes apparatus for moving the optical system in order to sharpen the image and processing apparatus for commanding the apparatus for moving as a function of the spatial high frequency content of a received image. Alternatively, image sharpening can be performed manually.

The apparatus for moving in one embodiment is a motor and pinion attached to a housing of the optical system. In another embodiment, the apparatus for moving the optical system is a stator and a rotor attached to the optical system housing.

Finally, there is also provided an IR probe system including a hand-held probe, a stationary detector and a fiber optic cable. The hand-portable probe acquires one line of an image, the stationary detector assembly detects the line of the image and the fiber optic cable connects the probe to the detector assembly. The hand-held probe is as described hereinabove. The detector assembly is also as described hereinabove with the exception that the IR sensor and an exit end of the fiber optic cable are located at the image and object planes, respectively, of the optical system of the hand-held probe.

BRIEF DESCRIPTION OF THE DRAWINGS

The present invention will be understood and appreciated more fully from the following detailed description taken in conjunction with the drawings in which:

FIG. 4B is a schematic illustration of a hand-held probe forming part of the probe system of FIG. 4A;

DETAILED DESCRIPTION OF PREFERRED EMBODIMENTS

Figure 1:
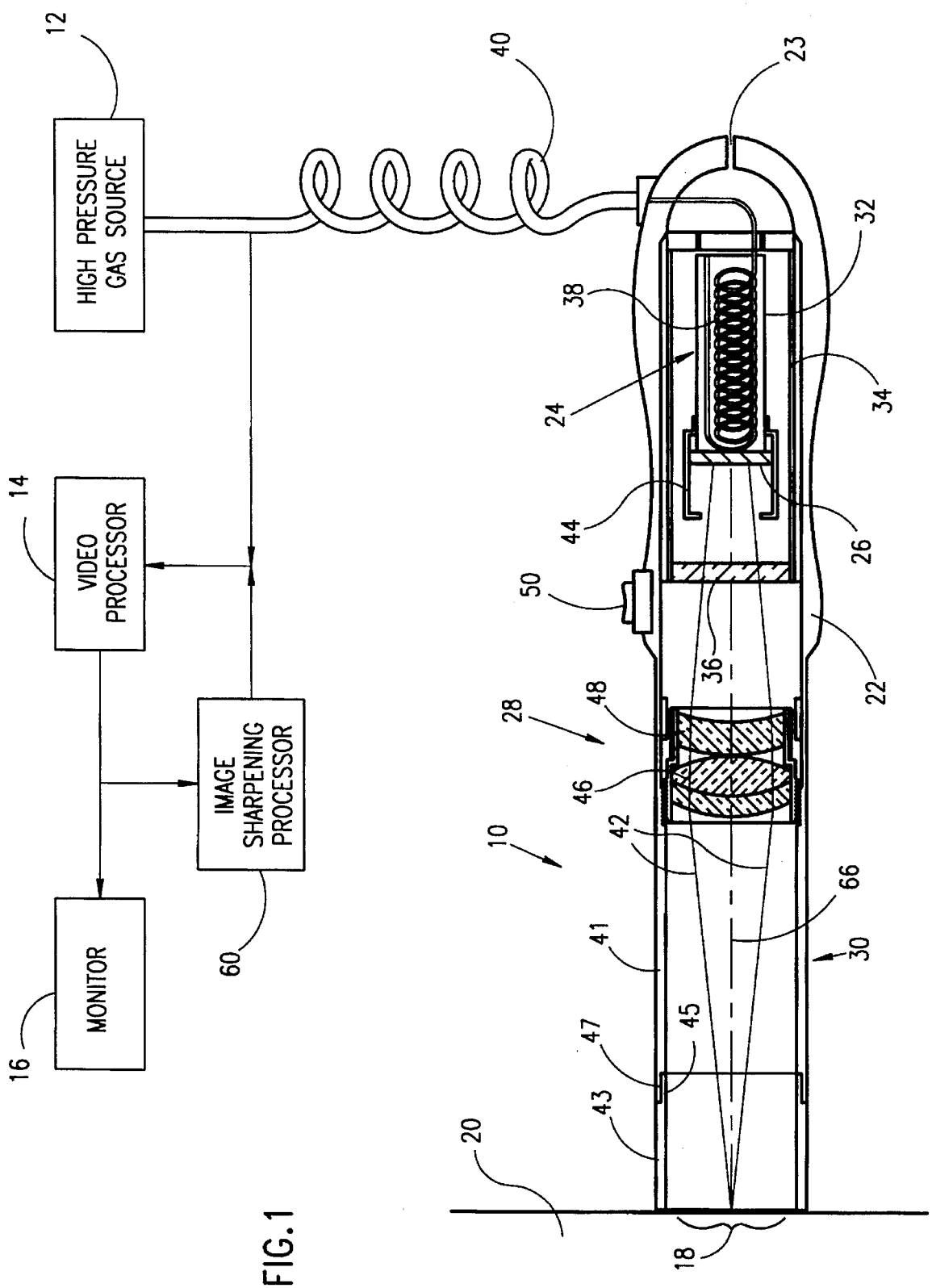
FIG. 1 is a schematic illustration of a probe system, constructed and operative in accordance with a preferred embodiment of the present invention.

Reference is now made to FIGS. 1, 2A, 2B, 3A and 3B which illustrate the probe system of the present invention. The probe system typically comprises a probe 10, a high pressure gas source 12, such as a tank or a compressor, a video processor 14 and a monitor 16. The probe 10 provides thermal images of a portion 18 of a body 20 to the video processor 14 which converts the images to a representation which the monitor 16 can display.

The probe 10 typically comprises a handle 22, a detector assembly 24 located within the handle, a two-dimensional IR sensor 26, an optical system 28 at a fixed distance from the sensor, and a spacing tube 30 defining the distance between the body 20 and the optical system 28.

The detector assembly 24 typically comprises a cold finger 32 on which the IR sensor 26 is placed, a dewar 34 surrounding the cold finger 32 and having a window 36, and a cryostat 38 formed of a coiled tube through which high pressure gas flows.

A suitable detector assembly 24 whose dewar 34 is small enough to fit within handle 22 is a Joule-Thomson minicooler. In order to maintain it in a known location within the probe 10, it is typically bonded to the handle 22. Handle 22 typically also has a vent 23 by which cooled gas is released to the atmosphere.

The cryostat 38 is tightly coiled within the cold finger, thereby providing maximal cooling. The cryostat is connected to a supply line 40 which, in accordance with the present invention is coiled loosely so as to provide flexibility when the operator moves the probe 10 around.

The IR sensor 26 can be any IR sensor which can be placed within a small detector assembly 24. For example, the IR sensor 26 can be the IHA128 chip manufactured by Cincinnati Electronics Corporation of Mason, Ohio, USA. Alternatively, the chip and electronics of the IRC160 camera also manufactured by Cincinnati Electronics Corporation can be utilized for IR sensor 26 and video processor 14. The monitor 16 can be any suitable television monitor.

The bonding of the detector assembly 24 to the handle 22 ensures that the location of the IR sensor 26 is fixed within the handle 22 and is fixed with respect to the optical system 28. The spacing tube 30 ensures that the body 20 is at a generally fixed distance to the optical system 28. The locations of the body 20, the optical system 28 and the IR sensor 26 are such that the body 20 is in the object plane and the IR sensor 26 is in the image plane, rather than the focal plane, of the optical system 28. Lines 42 describe the range of rays from the portion 18 of the body 20 to the IR sensor 26. A cold shield 44 is typically attached to the cold finger 32 to ensure that generally only the desired rays reach the IR sensor 26.

Figure 2A:
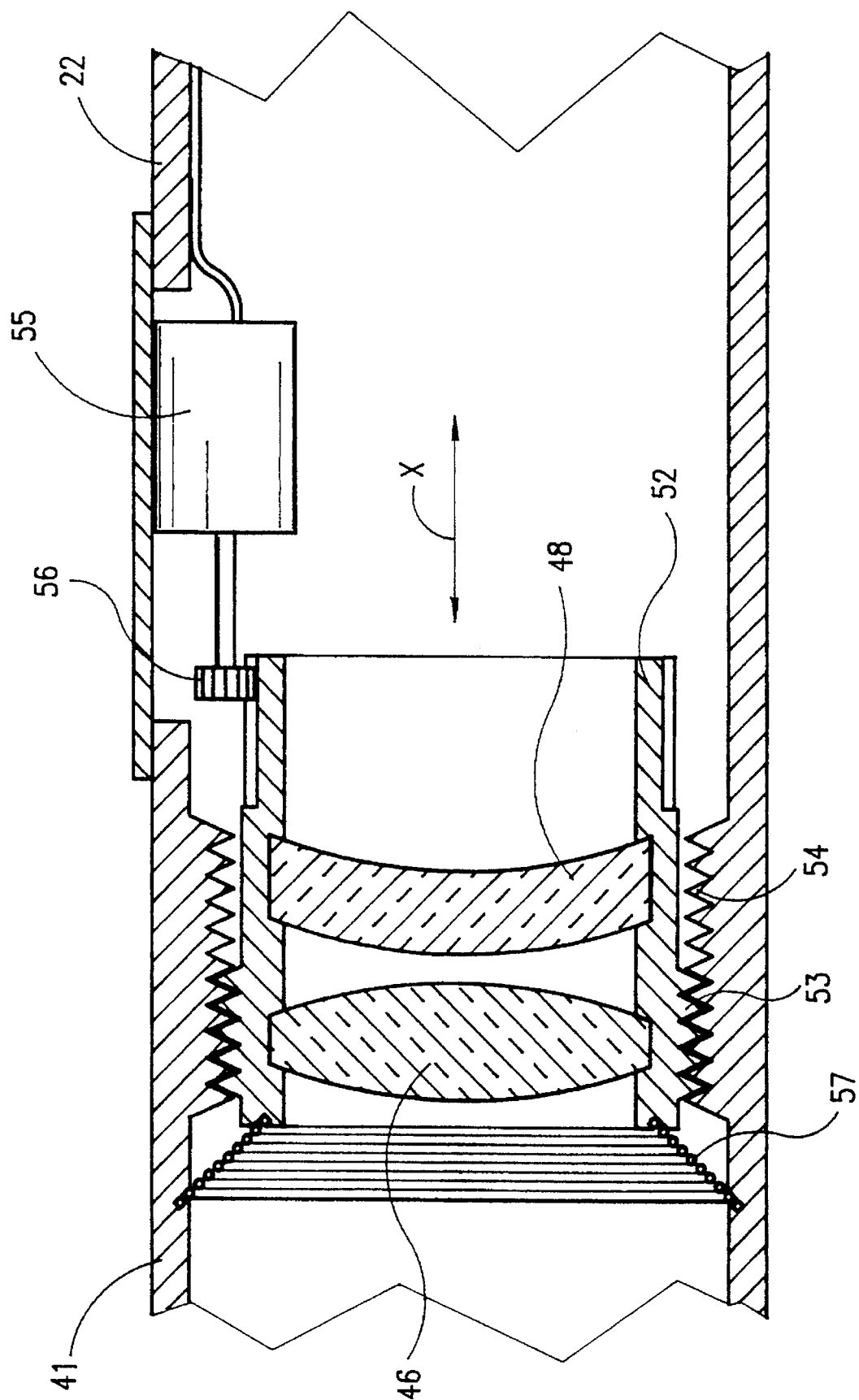
FIG. 2A and 2B are schematic illustrations of a portion of the system of FIG. 1 illustrating two embodiments of an image sharpening system.
Figure 2B:
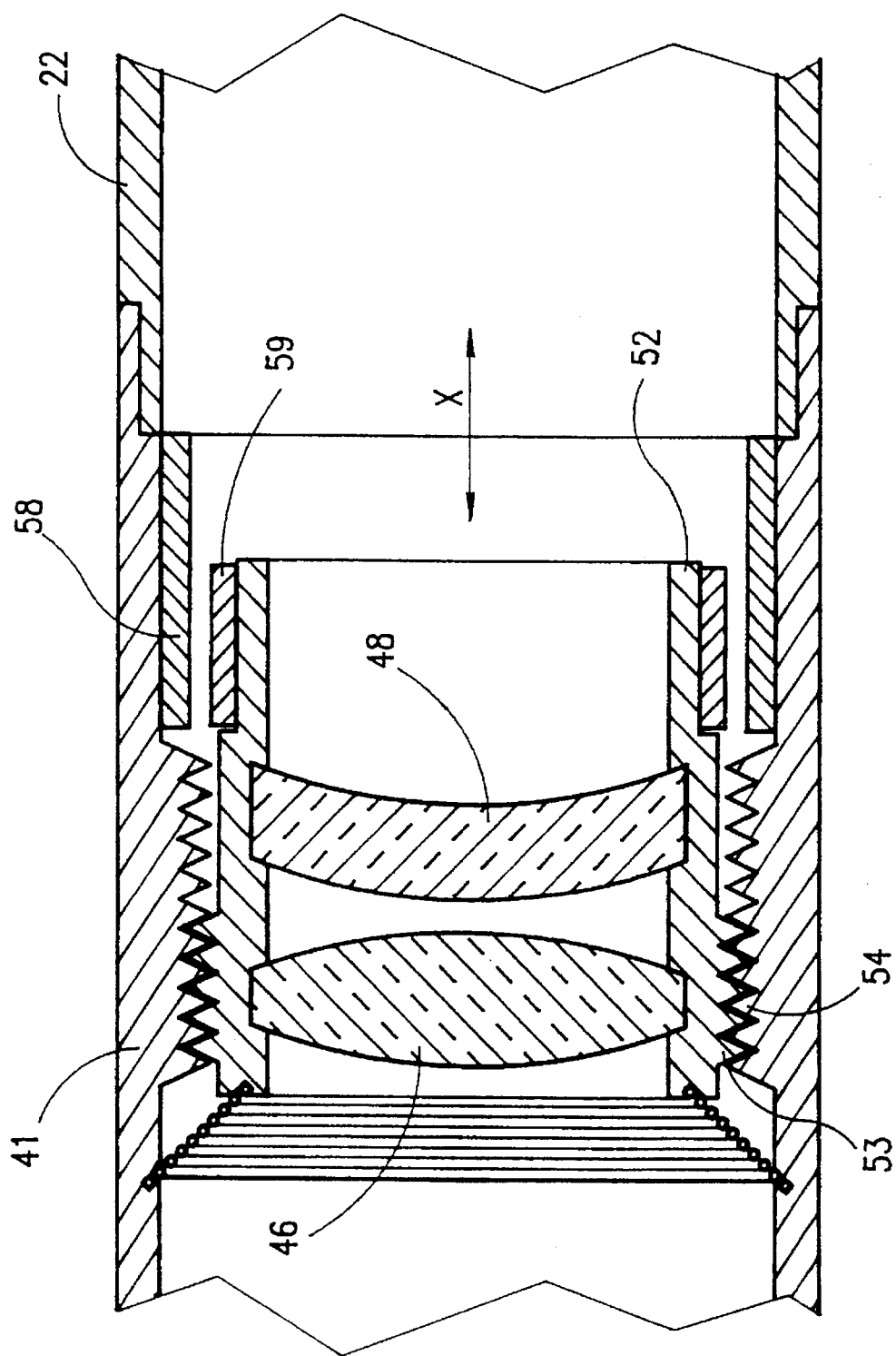
Figure 3A:
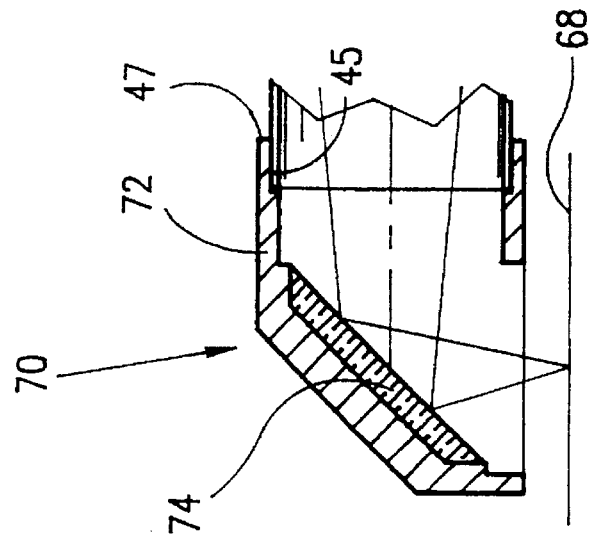
FIG. 3A is a schematic illustration of an end attachment for the probe of FIG. 1 which enables the probe to view a body at an angle to the main axis of the probe.
Figure 3B:
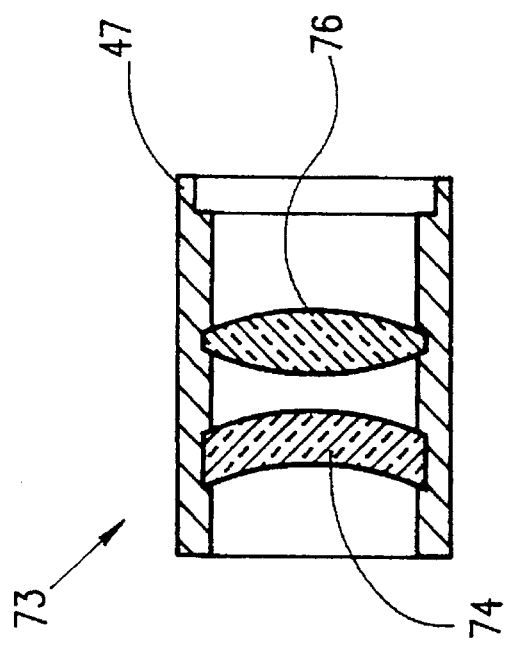
FIG. 3B is a schematic illustration of an end attachment for the probe of FIG. 1 which enables the probe to view objects at a distance from the probe.

The optical system 28 can be formed of any suitable optical elements which can image portion 18 onto the IR sensor 26. Shown in FIGS. 1, 2A and 2B are a positive lens 46 and a negative lens 48 typically formed of IR transmitting material such as Germanium, Silicon, ZnS or ZnSe.

Spacing tube 30 typically comprises a tube 41 and an end attachment 43. In the embodiment of FIG. 1, the end attachment is a simple tube extension. In other embodiments, as described in more detail with respect to FIGS. 3A and 3B, the end attachment changes the location of the body being viewed. The attaching mechanism can be any suitable mechanism. Shown is an indented ting 45 on tube 41 and corresponding protruding rings 47 on the attachment 43.

Both tube 41 and end attachment 43 are typically formed from any of a variety of materials which have minimal thermal deformation and which minimize stray IR radiation emission from the walls of the tube 41 and attachment 43. It will be appreciated that thermal deformation will cause the length of spacing tube 30 to change and therefore, must be reduced or eliminated. Exemplary materials for the tube 30 are Kovar or Invar steel, plastics and metalized plastics. Additionally, spacing tube 30 is open to the atmosphere so that the temperature of the portion 18 being imaged will not be affected by contact with the spacing tube 30.

The operator typically moves the probe 10 across the body 20 and the images produced are continually shown on the monitor 16 and can be continually recorded on a videotape. If it is desired to store the image of a particular area of the body 20, the operator can press on a frame grabbing button 50 which, when depressed, indicates to the monitor 16 to store the image currently being displayed onto a suitable memory medium.

The body 20 can be a piece of metal, an electronic circuit board, an element of a machine, a portion of the human body, or any other surface whose thermal image is desired. If it is a human body, the possibility exists that the probe 10 may be pushed slightly into the skin of the subject, thereby slightly changing the location of the object plane with respect to the optical system 28. Therefore, the optical system 28 typically also comprises an image sharpening system.

FIGS. 2A and 2B illustrate two alternative image sharpening systems both of which change the location of lenses 46 and 48 vis-a-vis both the IR sensor 26 and the body 20. In both systems, the lenses 46 and 48 are located within a lens housing 52 having screw threads 53 and the handle 22 is formed with matching screw threads 54 in the area of the lens housing 52. Screw threads 54 may be differential in order to provide finer adjustment.

In the system of FIG. 2A, a motor 55 rotates a pinion 56 attached to lens housing 52, causing the lens housing 52 to rotate and translate along an X axis. A preloaded spring 57 is used to secure the lens housing 52 in a selected location.

In the system of FIG. 2B, the motor and pinion are replaced by a direct drive system formed of a stator winding 58 and a rotor 59 formed of permanent magnets. The application of current to the stator 58 induces rotor 59 to rotate, causing lens housing 52 to rotatably move in the X direction.

In both systems, the commands to the image sharpening systems are received from an image sharpening processor 60 (FIG. 1) which analyzes the images received from IR sensor 26. Typically, processor 60 performs high spatial frequency detection and indicates to the image sharpening system to translate the lenses 46 and 48 until the location of greatest sharpness, being the location where the image has the most high frequency elements, is found. Alternatively, the sharpening can be manually performed.

It is noted that the probe 10 illustrated in FIG. 1 is operative for scanning the surface of a body 20, wherein the surface is generally perpendicular to an optical axis 66 of probe 10. For surfaces which are parallel to axis 66, such as surface 68 of FIG. 3A, an end attachment 70 can be utilized. Attachment 70 (FIG. 3A) typically comprises a detachable housing 72 having therein a mirror 74, located at 45° to the axis 66. Mirror 74 is located such that the optical path from the surface 68 to the optical system 28 is equivalent to that from body 20 to optical system 28.

Other attachments can also be utilized. For example, the attachment, labeled 73, shown in FIG. 3B enables the probe 10 to view objects at a distance. Attachment 73 typically comprises a positive lens 74 and a negative lens 76.

Figure 4A:
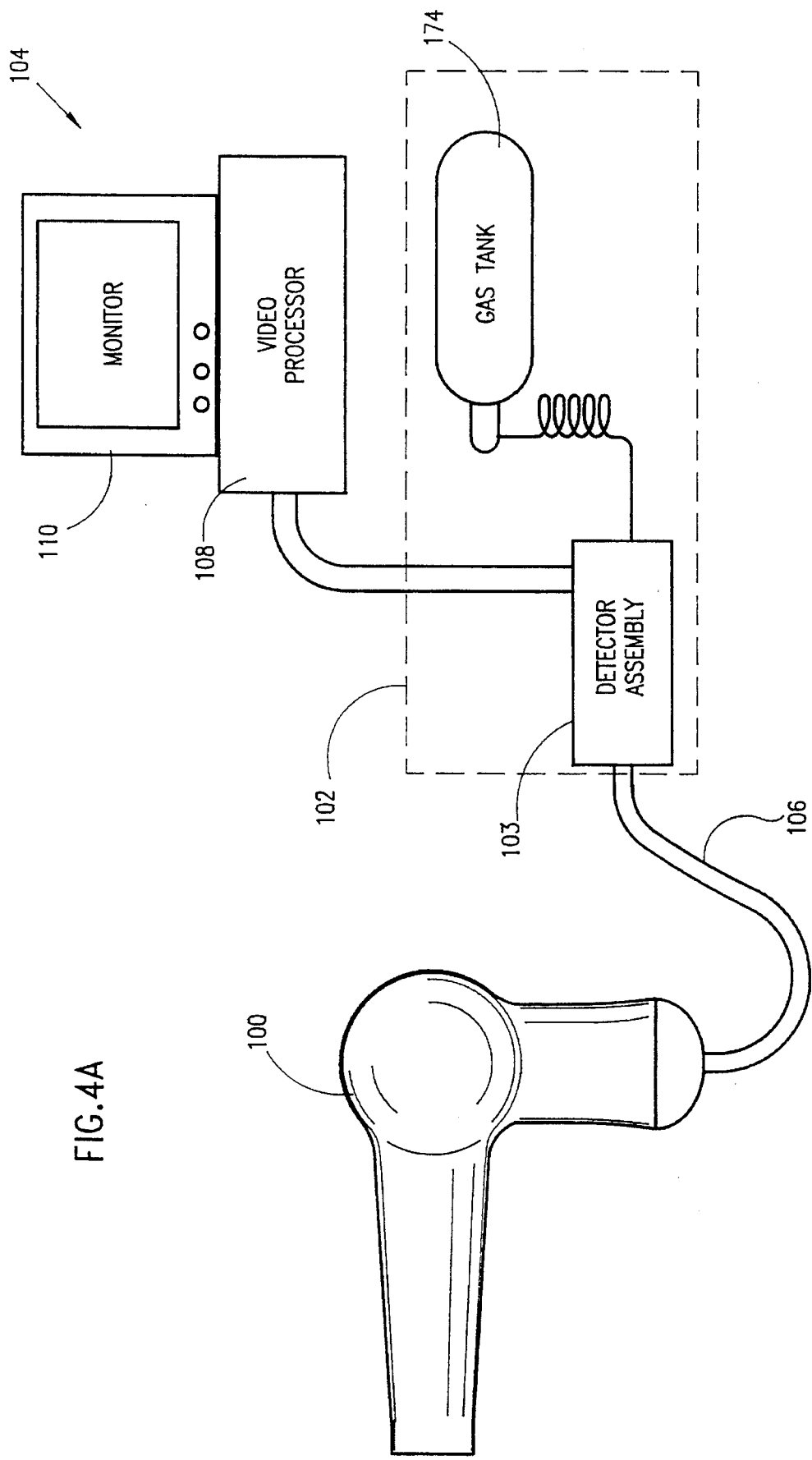
FIG. 4A is a schematic illustration of an alternative probe system, constructed and operative in accordance with a second embodiment of the present invention.
Figure 4C:
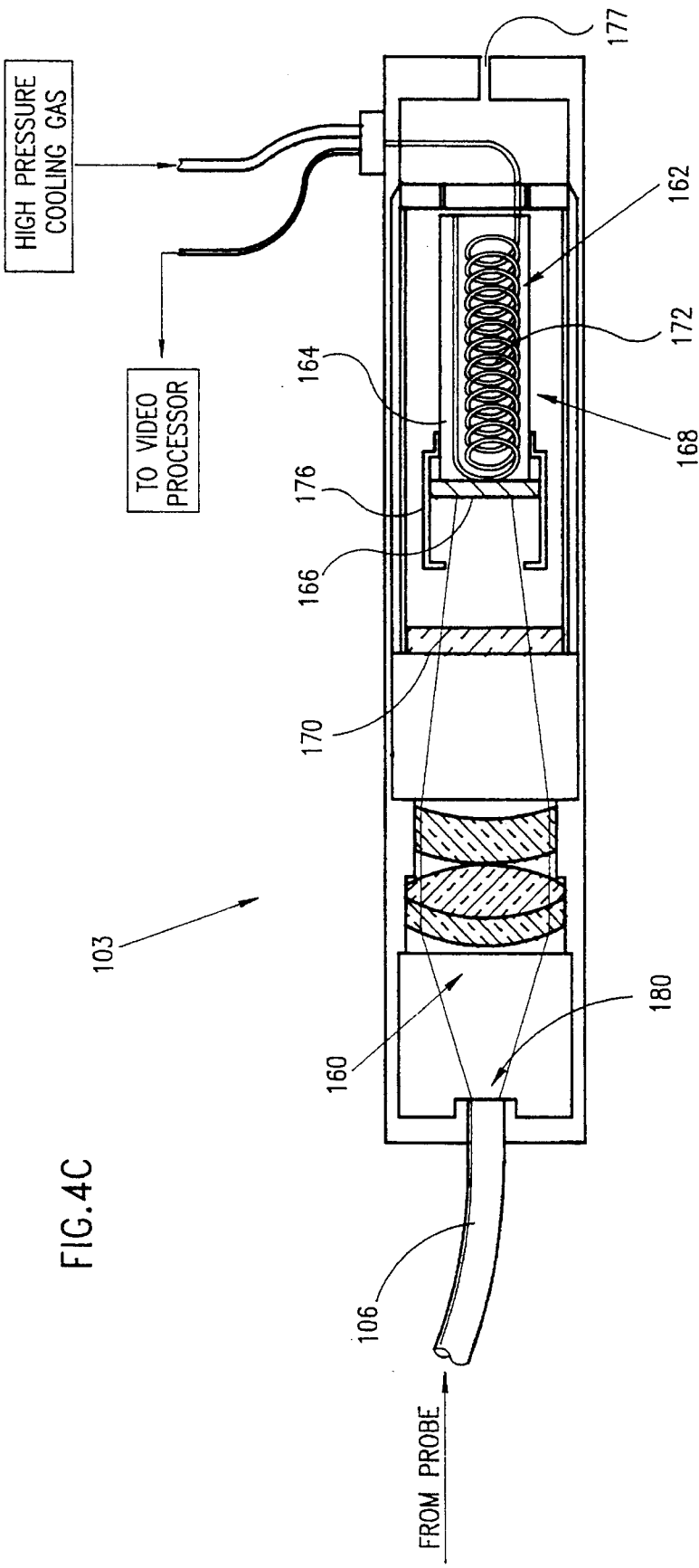
FIG. 4C is a schematic illustration of a detector assembly forming part of the probe system of FIG. 4A.

Reference is now made to FIGS. 4A, 4B and 4C which illustrate an alternative embodiment of the present invention operative for a linear (one-dimensional) IR sensor. FIG. 4A illustrates the probe system of the alternative embodiment including a hand held probe 100, a detector assembly 102 removed from the probe 100 and a processor 104. FIG. 413 details the elements of probe 100 and FIG. 4C details the elements of detector assembly 102.

In the probe system of FIG. 4A, the hand-held probe 100 is movable and the detector assembly 102 and processor 104 are stationary. The hand-held probe 100 is operative to scan the field of view, one line at a time, and to provide each line to the detector assembly 102 via fiber optic cables 106. The detector assembly 102 converts the light beams into data signals for each line of the field of view. The processor 104, typically comprising a video processor 108 and a monitor 110 similar to processor 14 and monitor 16, displays the resultant image.

As can be seen in FIG. 4B, the hand-held probe 100 typically comprises a housing 120 formed of a handle 122 and a tube 124. Attachable to tube 124 are any of the end attachments 43, 70 and 73 described hereinabove.

The hand-held probe 100 additionally comprises a front-end optical system 150, a scanner 152 and a back-end optical system 154. The front-end optical system 150 receives the IR light from an area of interest in the object plane 126 and collimates the light beam. The scanner 152, such as a galvo scanner, scans across the received light and deflects one line of it towards the back-end optical system 154. The scanner 152 scans the area of interest by pivoting about an axis 151, as noted by arrow 153.

The back-end optical system 154 focusses the received light onto an input end 156 of the fiber optic cable 106. An 2inner surface 158 of the handle 122 is typically coated with a low emissivity coating thereby to ensure that most of the IR light is focussed onto input end 156.

The detector assembly 102 (FIG. 4C) typically comprises a detector optical system 160 and a detector assembly 162. The detector assembly 162 typically performs Joule-Thomson cooling and typically comprises a cold finger 164 on which a linear IR sensor 166 is placed, a dewar 168 surrounding the cold finger 164 and having a window 170, a heat exchanger formed of a cryostat 172, a cold shield 176 (FIG. 4C), and a vent 177.

The cryostat 172 is tightly coiled within the cold finger, thereby providing maximal cooling. The IR sensor 166 can be any appropriate linear IR sensor, such as the IHL series manufactured by Cincinnati Electronics Corporation operating with the ABC-A video processor. The other elements are similar to those described in the previous embodiment.

The detector optical system 160 is typically operative to receive IR light from an exit end 180 of fiber optic cable 106 and to image it onto the IR sensor 166. As in the previous embodiment, the IR sensor 166 is placed at the image plane rather than at the focal plane of the detector optical system 160.

Figure 5:
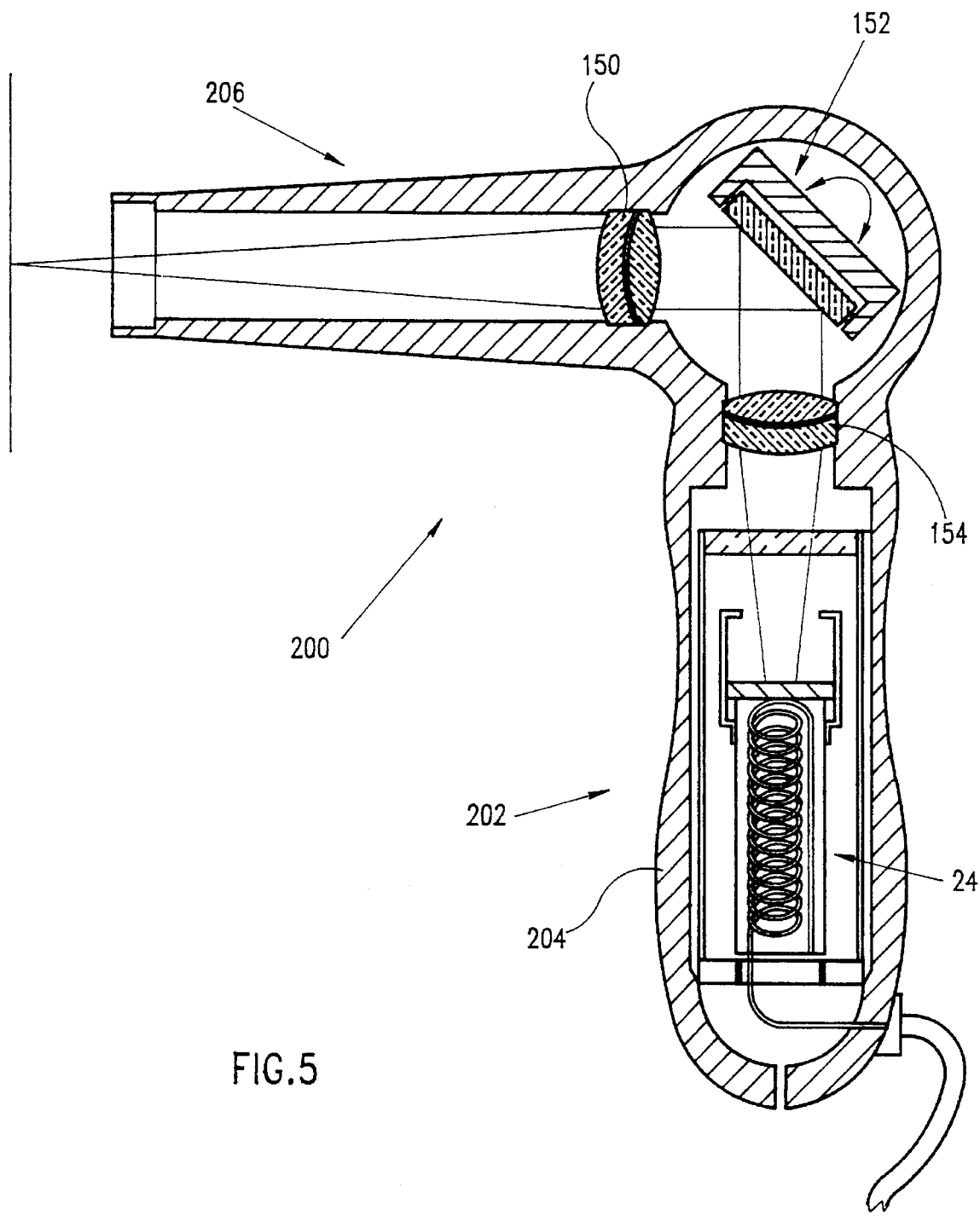
FIG. 5 is a schematic illustration of a hand-held probe performing scanning, constructed and operative in accordance with a third embodiment of the present invention.

Reference is now made to FIG. 5 which illustrates a further alternative embodiment of the probe of the present invention also operative for a linear IR sensor, but with the detector assembly within the probe housing.

The probe, labeled 200, comprises the optical elements of probe 100 (FIG. 4B) and the detector assembly 24 of probe 10 (FIG. 1). Thus, probe 200 comprises front-end optical system 150, scanner 152 and back-end optical system 154. Back-end optical system 154 typically focuses the collimated light onto the detector assembly 24, as opposed to the previous embodiment wherein it focusses the collimated light onto the fiber optic entrance end 156.

Probe 200 typically has a housing 202 formed of a handle 204 and a tube 206. Tube 206 is similar to tube 124. Handle 204 is similar to handle 122 but it is typically longer so as to include the detector assembly 24.

It will be appreciated by persons skilled in the art that the present invention is not limited to what has been particularly shown and described hereinabove. Rather the scope of the present invention is defined by the claims which follow:

I claim:

1. A hand-held infra-red (IR) probe for imaging the temperature distribution of a body, the probe comprising:
   a hand-held housing;
   a detector assembly having a cold finger attached within said housing;
   an IR sensor attached on a cold end of said cold finger;
   an optical system located at a known distance from said IR sensor; and
   a spacing tube of a predetermined length for locating said body at a generally known location from said optical system,
   wherein said IR sensor and body are located at the image and object planes, respectively, of said optical system.

2. A probe according to claim 1 and also comprising a coiled high pressure gas supply line providing high pressure gas to said detector assembly.

3. A probe according to claim 1 and wherein said spacing tube is formed of a material having minimal thermal deformation and which is operative to minimize stray IR radiation.

4. A probe according to claim 1 and wherein said spacing tube is comprised of a fixed tube and an end attachment detachable from said fixed tube.

5. A probe according to claim 4 and having an optical axis parallel to an axis of said spacing tube and comprising an end attachment for viewing a body located parallel to said optical axis.

6. A probe according to claim 5 and wherein said end attachment comprises a detachable mirror.

7. A probe according to claim 4 and wherein said end attachment comprises an attachment for viewing objects at a distance.

8. A probe according to claim 1 and wherein said IR sensor is a two-dimensional IR sensor.

9. A probe according to claim 1 and also comprising an image sharpening system.

10. A probe according to claim 9 and wherein said image sharpening system comprising means for moving said optical system and processing means for commanding said means for moving based on the spatial high frequency content of a received image.

11. A probe according to claim 10 wherein said optical system is located within an optical system housing and wherein said means for moving comprise a motor and pinion attached to said optical system housing.

12. A probe according to claim 10 wherein said optical system is located within an optical system housing and wherein said means for moving comprise a stator and rotor, said rotor attached to said optical system housing.

13. A hand-held infra-red (IR) probe for imaging the temperature distribution of a body the probe comprising:
   a hand-held housing;
   a detector assembly having; a cold finger attached within said housing;
   a one-dimensional IR sensor attached on a cold end of said cold finger;
   a back-end optical system located at a known distance from said IR sensor;
   a front-end optical system for collimating light from a field of view;
   a one-axis scanner for scanning said field of view onto said one-dimensional IR sensor; and a coiled high pressure gas supply line providing high pressure gas to said detector assembly from a gas source external to said housing, wherein said back-end optical system is located between said scanner and said IR sensor.

14. A hand-held infra-red (IR) probe for imaging the temperature distribution of a body, the probe comprising:

a hand-held housing;

a detector assembly having a cold finger attached within said housing;

a two-dimensional IR sensor attached on a cold end of said cold finger; and a coiled high pressure gas supply line providing high pressure gas to said detector assembly from a gas source external to said housing.

15. A hand-held infra-red (IR) probe system for imaging the temperature distribution of a body, the system comprising:

a hand-held probe for acquiring one line of an image;

a stationary detector assembly for detecting said line of said image; and fiber optic cable connecting said probe to said detector assembly, wherein said probe comprises:

an optical system; and a spacing tube of a predetermined length for locating said body at a generally known location from said optical system, said spacing tube being open at an end which abuts said body.

16. A system according to claim 15 and wherein said detector assembly comprises:

a cold finger;

a linear IR sensor attached on a cold end of said cold finger; and an optical system located at a generally known distance from said IR sensor, wherein said IR sensor and an exit end of said fiber optic cable are located at the image and object planes, respectively, of said optical system.

17. A system according to claim 15 and wherein said hand-held probe comprises a scanner for scanning an area of interest and for providing one line of said area of interest.

18. A probe according to claim 15 and also comprising a coiled high pressure gas supply line providing high pressure gas to said detector assembly.

19. A probe according to claim 15 and wherein said spacing tube is formed of a material having minimal thermal deformation and which is operative to minimize stray IR radiation.

20. A probe according to claim 15 and wherein said spacing tube is comprised of a fixed tube and an end attachment detachable from said fixed tube.

21. A probe according to claim 20 and having an optical axis parallel to an axis of said spacing tube and comprising an end attachment for viewing a body located parallel to said optical axis.

22. A probe according to claim 21 and wherein said attachment comprises a detachable mirror.

23. A probe according to claim 21 and wherein said end attachment comprises a lens assembly for viewing objects at a distance.

* * * * *